United States Patent
Harte

[15] 3,641,326
[45] Feb. 8, 1972

[54] CIRCUIT FOR AND METHOD OF MULTIPLEXING FOR MONITORING A PLURALITY OF SEPARATE MACHINE TOOLS

[72] Inventor: Robert B. Harte, Taylor, Mich.
[73] Assignee: Buhr Machine Tool Company, Ann Arbor, Mich.
[22] Filed: Nov. 22, 1968
[21] Appl. No.: 778,263

[52] U.S. Cl............................235/151.11, 318/562, 340/147
[51] Int. Cl.............................................................G08c 15/00
[58] Field of Search....................235/151.11, 151.1, 151, 92, 235/150.5; 340/147, 150, 147 MT, 172.5, 146.1; 328/26; 307/261; 318/562

[56] References Cited

UNITED STATES PATENTS

| | | | |
|---|---|---|---|
| 2,949,600 | 8/1960 | Le May et al. | 340/147 MT UX |
| 3,015,088 | 12/1961 | Bower | 340/147 MT UX |
| 3,184,725 | 5/1965 | Siegel et al. | 340/147 X |
| 3,227,864 | 1/1966 | Kadoguchi | 235/151.11 |
| 3,324,458 | 6/1967 | MacArthur | 340/147 UX |
| 3,341,660 | 9/1967 | Duerdoth | 340/147 X |
| 3,103,614 | 9/1963 | Mynall | 318/562 |
| 3,274,553 | 9/1966 | Oya | 318/562 X |
| 3,465,298 | 9/1969 | La Duke et al. | 318/562 X |
| 3,483,362 | 12/1969 | Feldmann et al. | 235/150.5 |

Primary Examiner—Joseph F. Ruggiero
Attorney—Whitemore, Hulbert and Belknap

[57] ABSTRACT

The multiplexing circuit disclosed includes a translator and a plurality of separate interface circuits adapted to be alternatively connected to the translator over a single buss. Each of the interface circuits is connected to a plurality of specific points at which electrical conditions are to be monitored in a corresponding one of a plurality of machine tool control panels. Monitoring of all the control panels is accomplished in conjunction with one translator multiplexed to the separate interface circuits under sequencing control of a computer connected to the translator and interface panels. The translator converts the usual 115-volt alternating current signals from the control circuits into signals usable by the computer.

In operation the computer at a desired speed and in a desired sequence will provide control signals to the separate interface circuits to connect the control panels of individual machine tools to the translator for translation of monitored signals to the computer. Thus each of a plurality of separate machine tools is monitored with a single computer without the necessity of separate conversion circuits at each control panel. Only the standard 115-volt 60-cycle alternating current electric energy of the control panels pass between the interface panels and the translator.

10 Claims, 3 Drawing Figures

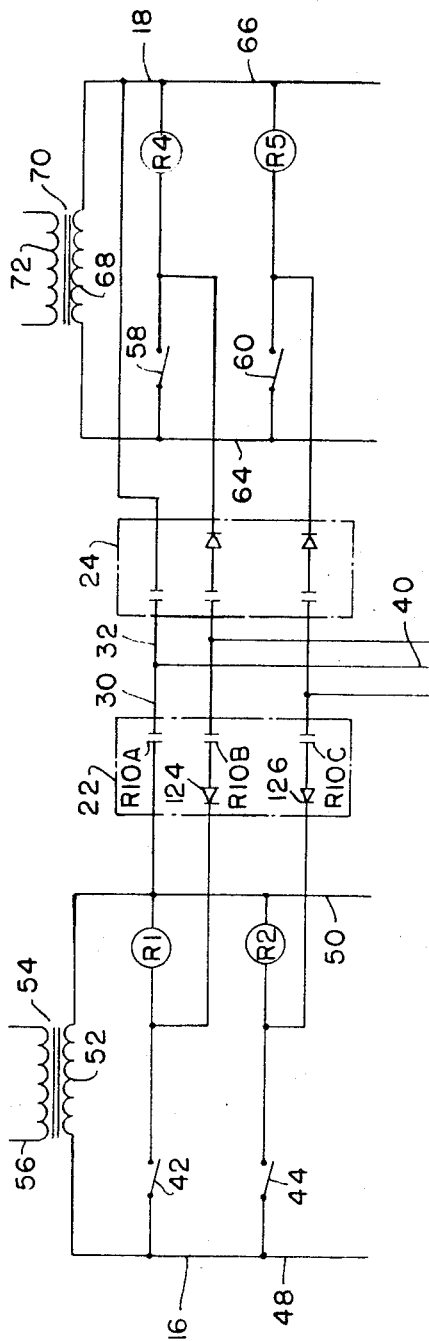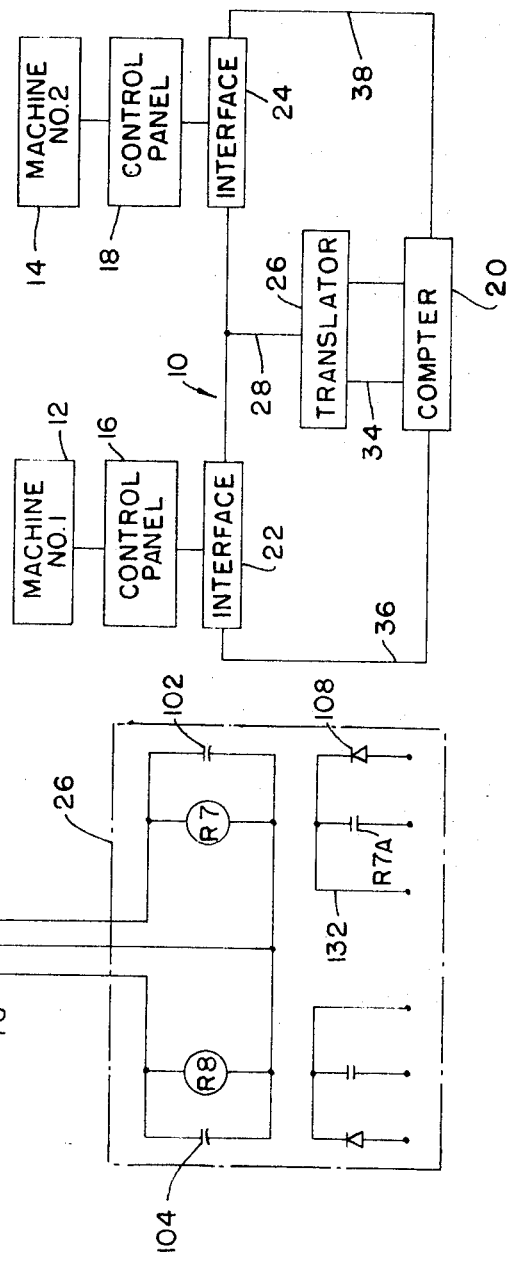

INVENTOR
ROBERT B. HARTE
BY Whittemore, Hulbert & Belknap
ATTORNEYS

CIRCUIT FOR AND METHOD OF MULTIPLEXING FOR MONITORING A PLURALITY OF SEPARATE MACHINE TOOLS

BACKGROUND OF THE INVENTION

1. Field of the Invention

The invention relates to multiplexing circuits and methods and refers more specifically to structure for and a method of monitoring a plurality of separate machine tools each having a separate control panel including a number of different electrical conditions to be monitored with a single computer by multiplexing including bussing the electric energy of the control panels over a single buss to a remote translator from interface circuits connected to the control panels for translation into signals usable by the computer.

2. Description of the Prior Art

In the past, machine control panels have often been monitored separately and casually at the machine by machine operators when they have been monitored at all. Where monitoring by multiplexing a plurality of separate control panels to a computer has been accomplished in the past, the control panel energy has usually been converted to relatively low-voltage DC signals accepted by the computer at the control panel and transmitted in converted form to the computer. Providing individual converters at the individual machine tool control panels is expensive and transmission of the low-voltage signals over long busses to the computer is inefficient in that considerable noise will consequently be detected in the signal at the computer.

SUMMARY OF THE INVENTION

The invention includes the method of monitoring a plurality of machine tools having separate 115-volt, 60-cycle alternating current control panels with a single computer by multiplexing the control panels selectively to the computer through separate interface circuits and a single translator connected to the computer and each interface panel by a single buss without converting the energy between the control panels and translator. Switching between the individual interface circuits to provide computer monitoring of an individual control panel is accomplished in response to computer interrogation signals.

Two separate multiplexing circuits are disclosed in accordance with the invention each including a single translator for translating signals from the interface circuits into an output usable by the computer. Separate interface circuits each including circuits connected to a plurality of points in the associated control panel at which the electrical conditions in the associated control panel are to be monitored are also included in each multiplexing circuit. The interface circuits also include structure for isolating the interface circuits from the translator in response to computer commands to permit multiplexing the interface circuits to the translator over a single buss.

BRIEF DESCRIPTION OF THE DRAWINGS

FIG. 1 is a block diagram showing the multiplexing circuit of the invention for performing the method of the invention connected between two machine tools to be monitored each of which have electrical control panels, and a single computer.

FIG. 3 is a schematic diagram of a modification of the multiplexing monitoring circuit of the invention.

DESCRIPTION OF THE PREFERRED EMBODIMENTS

Figure 2:
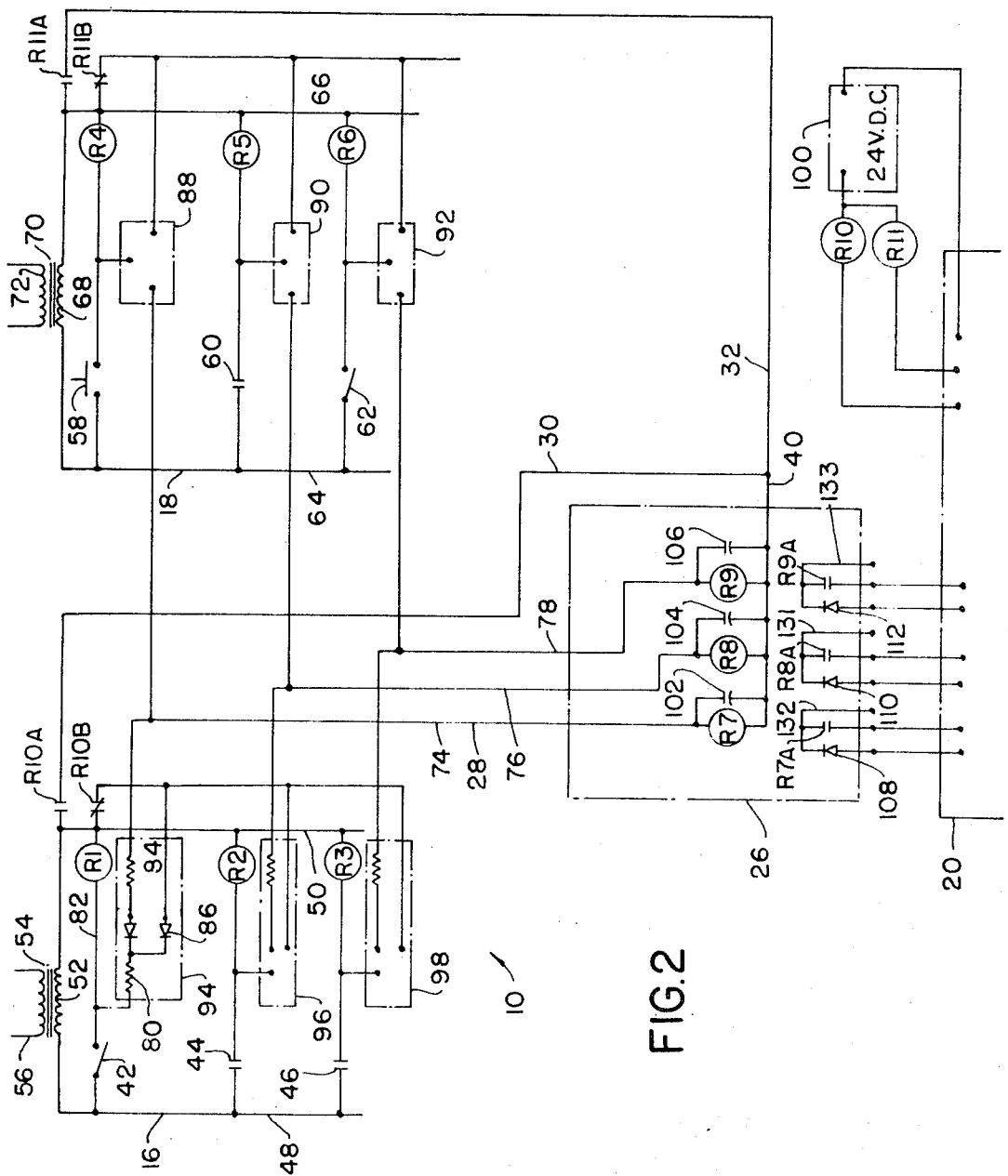
FIG. 2 is a schematic diagram of the multiplexing monitoring circuit of the invention.

As shown in FIG. 1, the multiplexing circuit 10 for use in monitoring the machine tools 12 and 14 having electrical control panels 16 and 18 respectively with the computer 20 includes the separate interface circuits 22 and 24 connected to the translator 26 through a single buss 28. Required connections 34 are provided between the translator 26 and computer 20 while control of the interface circuits 22 and 24 by the computer 20 is over conductors 36 and 38 respectively.

More specifically, the multiplexing circuit 10 is shown in schematic form in FIG. 2 in conjunction with a portion of the schematic of the control panels 16 and 18. In FIG. 2 the computer 20 is indicated only in partial phantom.

As shown in FIG. 2 the control panel 16 includes the relay coils R1, R2 and R3 energized through the limit switch 42 and relay contacts 44 and 46 respectively over conductors 48 and 50 which in turn are connected to the secondary windings 52 of the transformer 54. The primary winding 56 of the transformer 54 may by connected to a 460-volt alternating current source of electrical energy not shown.

Similarly, the portion of the control panel 18 shown includes relay coils R4, R5 and R6 energized through pushbutton switch 58, relay contacts 60, and limit switch 62 over conductors 64 and 66 from the secondary winding 68 of the transformer 70 having a primary winding 72 connected to a separate source of electrical energy of 460-volts, 60-cycle alternating current not shown.

Interface circuit 22 as shown in FIG. 2 includes a separate conductor 74, 76 and 78 in buss 28 connected between the interface circuit and translator 26 for each condition it is desired to sense in monitoring the control panel 16 such as the condition of energization of the relays R1, R2 and R3 respectively. Each of the conductors 74, 76 and 78 are connected to a current-limiting resistor 80, an isolating diode 82 and a resistance 84 connected in series as shown in circuit 94. The resistance 84 may be found in the relay coils of the translator 26 or in the resistance of the buss 28.

Interface circuit 22 further includes the normally open relay contacts R10A in the return circuit from the translator 26 to the control panel 16 over conductors 40 and 30. A separate bypass circuit including the isolating diode 86 and normally closed contacts R10B is also included in the interface circuit 22 for bypassing signals in circuit 94 around the buss 28 and therefore the translator 26 when the contacts R10B are closed.

The interface circuit 24 is exactly similar to the interface circuit 22 having separate circuits 88, 90 and 92 connected to monitor the condition of the relay coils R4, R5 and R6, just as the circuit 94 and the circuits 96 and 98 monitor the condition of the relays R1, R2 and R3 in the panel 18, when the relay contacts R11A which are normally open are closed and contacts R11B are open. As before, the usual return signal path from the translator 26 to the interface panel 24 is over conductors 32 and 40 and through the normally open relay contacts R11A when the circuit 18 is being monitored by the computer 20. When the control circuit 18 is not being monitored the translator 26 is bypassed through the then-closed contacts R11B.

It will be understood that substantially any selected number of control panel conditions may be simultaneously monitored by the addition of additional circuits as described in detail in conjunction with circuit 94 for each separate condition in each control panel. The addition of a new condition-monitoring circuit in conjunction with control panel 16 or 18 will require an additional conductor such as conductors 74, 76 and 78 extending between the interface circuit and the translator. However the return circuits from the translator and the translator bypass circuits of the multiplexing circuit 10 will remain substantially unchanged.

The relay contacts R10A and R10B and relay contacts R11A and R11B are caused to change state on energizing of the relay coils R10 and R11 respectively. Relay coils R10 and R11 are shown connected to a source of 24-volt direct current electrical energy and under control of the computer 20. Thus, in accordance with known computer operation and sequencing, the control panels 16 and 18 and additional control panels connected substantially as shown can be sequentially interrogated whereby the computer 20 may monitor the control panels of a plurality of separate machine tools, for example, such as machine tools 12 and 14.

As shown in FIG. 2, the translator 26 includes the relay coils R7, R8 and R9 which are bypassed by holding capacitors 102, 104 and 106 and which are connected respectively to the conductors 74, 76 and 78 at one end and to the conductor 40 at the other end as shown. Relays R7, R8 and R9 are operable to close the normally open contacts R7A, R8A and R9A in the monitoring circuits of the computer 20 which may be isolated by means of the diodes 108, 110 and 112 respectively. If nonisolated circuits are desired conductors 131, 132 and 133 are provided.

It will be noted that the signal from the control panels 16 and 18 to the translator 26 is a 115-volt, 60-cycle signal with contacts R10A closed and contacts R10B opened. Also, isolation diodes 82 are back-biased so that with R10A open and R10B closed less than 1 volt appears at the buss 28.

While the isolated contacts R7A, R8A and R9A are actuated by the translator as shown in FIG. 2, the signals into the translator 26 may be converted at the translator into a 5-volt logic level, for example, for use by the computer 20 or solid-state switches connected to ground can be actuated from the signals fed to the translator 26.

In overall operation of the multiplexing circuit 10 of FIG. 2 for monitoring the control panels 16 and 18 of the machine tools 12 and 14, the computer in a sequencing pattern which need not be considered in detail herein causes the circuit through the relay R10, for example, to be completed whereby the contacts R10A are closed and the contacts R10B are open. At this time a signal representative of the condition of relay coil R1 in control panel 16 passes through the resistor 80, the isolating diode 82, the resistance 84 over the conductor 74 in the buss 28 through the relay coil R7 in the translator 26 and out of the translator 26 on conductor 40 and through conductor 38 and the now closed contacts R10A back to the other side of the relay coil R1.

Thus it will be understood by those in the art that the relay contacts R7A are closed when the relay coil R1 in the control panel 16 is energized due to the simultaneous energizing of relay coil R7. When the contacts R10A are closed the condition of the relay coil R1 in the control panel 16 is thus sensed by the computer 20 through the isolated circuit including the diode 108 or through a nonisolated circuit not using the diode 108. Similarly, the condition of the relay coil R2 and the condition of the relay coil R3 is sensed at the same time on closing of the relay contacts R8A and R9A.

At this time the diodes similar to the diode 82 in the circuit 94 but in the circuits 88, 90 and 92 isolate the control panel 18 from the translator 26 due to the open condition of the relay R11A. In a same manner any other control panels connected to the translator 26 would at this time be isolated by a relay contact similar to contact R11A.

After having monitored the control panel 16 the computer causes the relay coil R10 to be deenergized whereby the contacts R10A and R10B return to the state shown in FIG. 2. At this time the signal through the resistor 80 passes through the diode 86 and through the normally closed contacts R10B back to the other side of the relay coil R1 effectively short circuiting relay coil R7 in the translator 26. The same relay contacts R10B as shown are connected to short circuit each of the circuits 94, 96 and 98 whereby the control panel 16 is completely isolated from the translator 26.

The computer 20 may then cause the relay R11, for example, to be energized in its sequencing process and in a manner similar to that described above, the condition of the relays R4, R5 and R6 are monitored by the computer 20 through the same translator circuits that the control panel 16 was monitored through. As will be understood, in the normal multiplexing operation, a number of control panels may be sequentially monitored with a single computer 20 by the use of the multiplexing circuit 10 disclosed in FIG. 2.

As indicated above, the circuit 10 has particular advantages in that the 115-volt, 60-cycle alternating current signal is used to provide the actuating power at the translator whereby separate converters are not required at each control panel and the noise levels on the buss 28 are lower. The result is a more efficient less expensive multiplexing circuit for monitoring machine tools and the like.

In the modified control circuit 120 illustrated in FIG. 3, each of the interface panels 22 and 24 include contacts R10A, R10B and R10C and a pair of isolating diodes 124 and 126 connected in series with the contacts R10B and R10C respectively. Contacts R10A are in the return circuit from the translator 26 while each series pair of isolating diodes 124 and 126 and contacts R10B and R10C are connected at one side of the relays R1 and R2 the condition of which is to be sequentially monitored as before in the control panel 16. Only the buss conductors 74 and 76 are shown in the buss 28 between the control panels 16 and 18 in FIG. 3 and the translator 26 since only two conditions are illustrated as being monitored in the circuit of FIG. 3. The return conduits 30, 32 and 40 are substantially the same as illustrated in FIG. 2.

Again, the number of circuits 16 and 18 can be amplified as can the number of individual conditions in any circuit to be monitored. The translator 26 is substantially the same as that illustrated in FIG. 2 and is similarly in communication with the computer 20 in the same manner. Also, the computer 20 again provides control signals to the interface panels 22 and 24 as before. However, the contacts R10A, R10B and R10C in the interface circuits of FIG. 3 are all normally open. These contacts are similar to contacts R10A and R10B in the interface panels 22 and 24 of FIG. 2.

In overall operation of the multiplexing circuit 120 illustrated in FIG. 3 in monitoring the control panels 16 and 18 when the relay R10 of the computer 20 is closed to close the contacts R10A and R10B, R10C, etc., the condition of the relay coil R1, for example, is monitored through the isolating diode 124, contacts R10B, conductor 74, relay coil R7, conductors 40 and 30, contacts R10A and back to the other side of the relay coil R1 as before. Thus, again, the contacts R7A are closed to permit sensing of the condition of the relay coil R1 by the computer 20 through either an isolated circuit including the isolating diode 108 or through a nonisolated circuit over conductor 132 as before.

When the relay coil R10 is deenergized by the computer 20 after monitoring the control panel 16 the conductors 74, 76 and 40 are no longer connected to the control panel 16 due to opening of the relay contacts R10A, R10B, R10C, etc. The computer may now interrogate the control panel 18 through the interface circuit 24 in the same manner as set forth above.

Again, it will be noted that the 115-volt, 60-cycle alternating current electrical signals from the control panels 16 and 18 are used to actuate the isolated relay contacts in the computer circuit 20, which again could be AC-to-DC logic level converters or solid-state switches or the like if desired, so that separate converters are not provided at the control panels 16 and 18 and the noise level transferred to the computer is maintained at a minimum. Inexpensive efficient operation of machine-tool monitoring is thus accomplished with the multiplexing circuit 120 as it was with the multiplexing circuit 10.

While two embodiments of the invention and modifications thereof have been disclosed in detail herein, it will be understood that other modifications and embodiments of the present invention are contemplated by the inventor. It is the intention to include all modifications and embodiments as are defined by the appended claims within the scope of the invention.

What I claim as my invention is:

1. A computer multiplexing system for monitoring a plurality of electrical control panels comprising a translator for transmitting signals passed thereto in a form unsuitable for use by a computer to a computer in a usable form, a plurality of interface circuits one connected to each of the individual control panels for monitoring a plurality of different conditions in each control panel and a single buss connected between the translator and individual interface circuits for passing signals in a form unusable by the computer between the interface circuits and the translator and means within the interface circuits responsive to computer commands for selectively isolating all but one of the interface circuits from the buss and translator.

2. Structure as set forth in claim 1, wherein the control panels are 115-volt, 60-cycle alternating current energized and the buss is energized directly from the control panels.

3. Structure as set forth in claim 2, wherein the translator includes a separate relay coil for each of the plurality of conditions to be monitored in the control panels and isolated relay contacts operably associated with each separate relay coil each connected in a separate computer circuit.

4. A multiplexing circuit for monitoring electrical control panels of a plurality of machine tools with a single computer, comprising a translator for simultaneously receiving a plurality of electrical signals representative of a plurality of separate conditions in a single control panel for actuating the computer in accordance therewith, means for returning the signals to the control panels from the translator and means connected between the control panels and translator for selectively coupling the control panels to the translator and for selectively isolating the control panels from the translator under control of the computer.

5. A multiplexing circuit for monitoring electrical control panels of a plurality of machine tools with a single computer, comprising a translator for simultaneously receiving a plurality of electrical signals representative of a plurality of separate conditions in a single control panel for actuating the computer in accordance therewith, means for returning the signals to the control panels from the translator and means connected between the control panels and translator for selectively coupling the control panels to the translator and for selectively isolating the control panels from the translator under control of the computer including a separate solenoid coil actuated by the computer for each control panel, normally open relay contacts in a single return line from the translator to the control panels and in a separate conductor from each control circuit for each condition monitored, each of which are in series with an isolating diode.

6. A multiplexing circuit for monitoring electrical control panels of a plurality of machine tools with a single computer, comprising a translator for simultaneously receiving a plurality of electrical signals representative of a plurality of separate conditions in a single control panel for actuating the computer in accordance therewith, means for returning the signals to the control panels from the translator and means connected between the control panels and translator for selectively coupling the control panels to the translator and for selectively isolating the control panels from the translator under control of the computer including a pair of isolating diodes, a first path to the translator through a dropping resistor, and a first return path through a normally open relay contact under control of the computer, and a second return path having no resistance therein, including an isolating diode and normally closed relay contacts under control of the computer.

7. A computer multiplexing system for monitoring a plurality of electrical control panels comprising a translator for transmitting signals passed thereto in a form unsuitable for use by a computer to a computer in a usable form, a plurality of interface circuits one connected to each of the individual control panels for monitoring a plurality of different conditions in each control panel and a single buss connected between the translator and individual interface circuits for passing signals in a form unusable by the computer between the interface circuits and the translator and means operably connected to the interface circuits responsive to computer commands for selectively isolating all but one of the interface circuits from the buss and translator.

8. The method of multiplexing for monitoring machine tools or the like comprising sensing a plurality of electrical signals representative of a plurality of separate conditions in a plurality of separate machine tool control panels which signals are in a form unusable by a computer, passing the electrical signals over a single buss to a translator for translating the signals into signals usable by a computer, translating the sensed signals into signals usable by a computer, and selectively coupling the control panels to the translator in response to signals from the computer.

9. The method as set forth in claim 8 wherein selectively coupling the control panels to the translator includes selectively passing the signals from control panels it is desired not to connect to the computer around the single buss and translator.

10. The method as set forth in claim 8 wherein selectively coupling the control panels to the translator includes isolating control panels it is desired not to connect to the computer from the translator.

* * * * *